United States Patent Office 3,106,582
Patented Oct. 8, 1963

3,106,582
PRODUCTION OF PENTABORANE(9)-ALKYLENE OXIDE REACTION PRODUCTS
Elmar R. Altwicker, Dayton, and Alfred B. Garrett, Columbus, Ohio, assignors to Olin Mathieson Chemical Corporation, a corporation of Virginia
No Drawing. Filed Apr. 2, 1957, Ser. No. 650,281
2 Claims. (Cl. 260—606.5)

This invention relates to fuels and, more particularly, to organoboron fuels.

The fuels of this invention, when incorporated with suitable oxidizers such as ammonium perchlorate, potassium perchlorate, sodium perchlorate, ammonium nitrate, etc., yield solid propellants suitable for rocket power plants and other jet propelled devices. Such propellants burn with high flame speeds, have high heats of combustion and are of the high specific impulse type. Probably the single most important factor in determining the performance of a propellant charge is the specific impulse; appreciable increases in performance will result from the use of higher specific impulse materials. The fuels of this invention when incorporated with oxidizers are capable of being formed into a wide variety of grains, tablets and shapes, all with desirable mechanical and chemical properties. Propellants produced by the methods described in this application burn uniformly without disintegration when ignited by conventional means, such as a pyrotechnic type igniter, and are mechanically strong enough to withstand ordinary handling.

By the process of my invention reaction products of pentaborane(9) and an alkylene oxide are prepared by the direct reaction of pentaborane(9) and an alkylene oxide, the alkylene group containing from 2 to 4 carbon atoms. The reaction temperature can be varied widely from about 25° to 110° C. In a like manner the molar ratio of alkylene oxide to pentaborane(9) can be varied from about 1:1 to 20:1. Various alkylene oxides such as ethylene, proplene or butylene oxide which contain from 2 to 4 carbon atoms in the alkylene group can be utilized in my process.

The following examples illustrate my invention, and in the examples the term "moles" signifies gram moles.

Example I

The reactor utilized in this experiment was a glass bulb of approximately 60 mls. capacity. Into this bulb which had previously been cooled to −196° C. by immersion in a bath of liquid nitrogen there were condensed 3.95 millimoles of pentaborane(9) and 6.2 millimoles of ethylene oxide. The reactor was then sealed off and the reactants allowed to warm to room temperature. The reactor at the end of two hours contained a homogeneous solution and there had been no evidence of a reaction. Then the reactor was placed on a water bath and heated at 100° C. for 4 hours. The reactor was then allowed to cool to room temperature; at this point a dark yellow, oily liquid was present in the reactor. The reactor was cooled to −196° C. and then attached to a vacuum line. In the next step the reactor was allowed to warm up to room temperature and the volatile material was passed through a trap maintained at −196° C. The ethylene oxide-pentaborane reaction product, which was a yellow, extremely viscous, liquid remained in the reactor. The product thus formed, which was not pyrophoric and which was soluble in acetone and benzene without decomposition, was shown by analysis to contain 9.7 percent boron by weight.

Example II

In a large graduated storage bulb attached to a vacuum manifold were condensed 3.9 millimoles of pentaborane(9) and 60.5 millimoles of ethylene oxide at a temperature of −196° C. On warming to 0° C., a homogeneous solution was formed but no visible reaction took place over a period of two hours at 0° C.

A piece of Pyrex combustion tubing was fitted with a joint and a seal-off constriction to form a tube having a volume of approximately 60 ml. The homogeneous solution was transferred under vacuum into the tube while the tube was held at −196° C. The tube was then sealed and heated for four hours at 100° C. During this time the contents of the tube changed from a clear liquid to a dark yellow oily-like mass. No further change was observed after standing for two days at room temperature.

The tube was attached to the vacuum system and opened by means of a tube opener. The contents of the tube were held at room temperature, but only a small amount of liquid transferred. The liquid which was transferred was colorless and was probably unreacted ethylene oxide. The viscous yellow material remained in the tube and it showed no visible change after three weeks storage at −78.5° C.

Based upon the amount of ethylene oxide charged, the yield of the viscous yellow material was at least 80 percent. A boron analysis indicated 9.7–9.8 percent by weight of boron. Infra-red indicated a compound having —$CH_2$—$CH_2$—O—O units. Also a B-H stretching band was present at 3.8–4.0μ.

Example III 5.44 millimoles of pentaborane(9) and 54.4 millimoles of ethylene oxide were condensed in a tube made of Pyrex combustion tubing and similar to that employed in Example II. The tube was sealed and held at room temperature for approximately 14 hours. After that time, the contents of the tube had changed to a yellow oily liquid which showed no further change in color or in viscosity on standing four days at room temperature. When the liquid was held at room temperature and under a high vacuum, some colorless liquid transferred, as was the case in Example II, but the major part of the yellow viscous oil did not transfer. An infra-red analysis of the yellow viscous oil gave a spectrum essentially identical with the material obtained in Example II.

Example IV 22.5 millimoles of pentaborane(9) and 26.0 millimoles of ethylene oxide were condensed at −196° C. in a reactor having a volume of 610 ml. The reactor was sealed and kept at room temperature for approximately 14 hours. A yellow viscous liquid was present in the reactor at that time. When subjected to a high vacuum at room temperature, the bulk of the yellow material did not transfer and was in behavior very similar to the materials obtained in Examples II and III.

The boron-containing materials produced by practicing the method of this invention can be employed as ingredients of solid propellant compositions in accordance with general procedures which are well-understood in the art, inasmuch as the materials produced by practicing the present process are readily oxidized using conventional solid oxidizers, such as ammonium perchlorate, potassium perchlorate, sodium perchlorate, ammonium nitrate and the like. In formulating a solid propellant composition employing one of the materials produced in accordance with the present invention, generally from 10 to 35 parts by weight of boron-containing material and from 65 to 90 parts by weight of oxidizer, such as ammonium perchlorate, are present in the final propellant composition. In the propellant, the oxidizer and the product of the present process are formulated in intimate admixture with each other as by dissolving the alkylene-oxide-pentaborane(9) reaction product in a solvent such as acetone or benzene, adding the required weight of finely divided oxidizer, intimately admixing the ingredients and then removing the solvent in a dryer to produce the desired propellant. The purpose of intimately admixing the propellant constituents as the art is aware, is to provide the proper burning characteristics in the final propellant. In addition to the oxidizer and the oxidizable material, the final propellant can also contain an artificial resin of the urea-formaldehyde or phenol-formaldehyde type, the function of the resin being to give the propellant mechanical strength and at the same time improve its burning characteristics. Thus, in manufacturing a suitable propellant, proper proportions of boron-containing material which has been dissolved in acetone or benzene are mixed with the finely divided oxidizer and up to 5–10 percent by weight of partially condensed urea-formaldehyde or phenol-formaldehyde resin based upon the weight of oxidizer and boron compounds. The ingredients are thoroughly mixed with simultaneous removal of the solvent, and following this the solvent-free mixture is molded into the desired shape, as by extrusion. Thereafter, the resin can be cured by resorting to heating at moderate temperatures. For further information concerning the formulation of solid propellant compositions, reference is made to U.S. Patent No. 2,622,277 to Bonnell et al. and U.S. Patent No. 2,646,596 to Thomas et al.

I claim:

1. A method for the production of a reaction product of pentaborane(9) and an alkylene oxide which comprises reacting pentaborane(9) and from 1 to 20 moles, per mole of pentaborane(9) of an alkylene oxide containing from 2 to 4 carbon atoms at a temperature within the range from about 25° C. to 110° C.

2. The method of claim 1 wherein said alkylene oxide is ethylene oxide.

No references cited.